Figure 11:
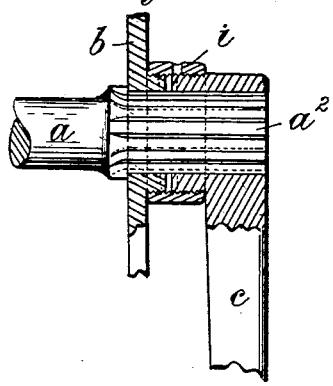

No. 738,065. PATENTED SEPT. 1, 1903.
J. V. PUGH.
FASTENING FOR WHEELS AND CRANKS.
APPLICATION FILED MAR. 3, 1903.
NO MODEL. 2 SHEETS—SHEET 1.
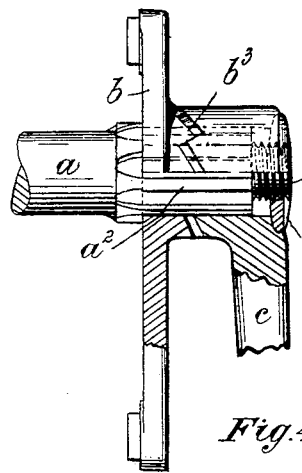
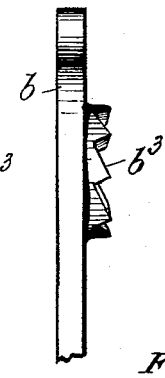
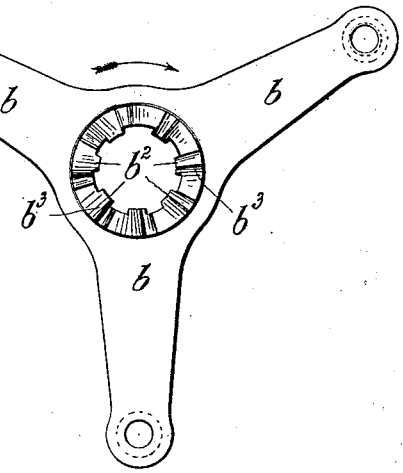
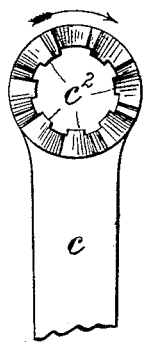
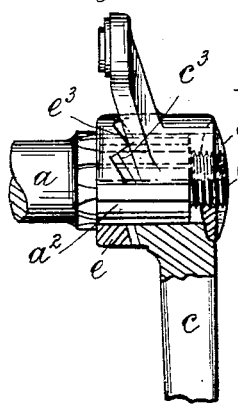
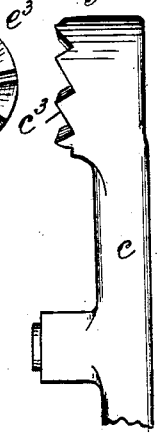
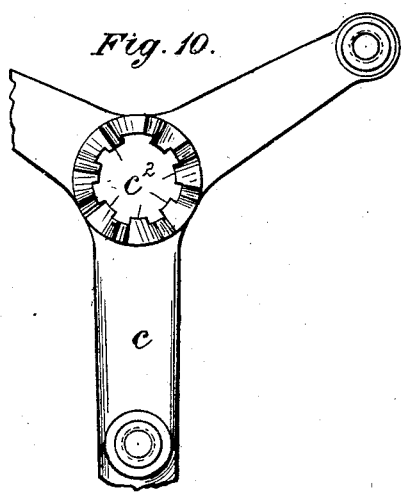
Witnesses —
Richard Skerrett
William J. Bowker
Inventor:—
John Vernon Pugh No. 738,065. PATENTED SEPT. 1, 1903.
J. V. PUGH.
FASTENING FOR WHEELS AND CRANKS.
APPLICATION FILED MAR. 3, 1903.
NO MODEL. 2 SHEETS—SHEET 2.

Witnesses:—
Richard Skerrett
William J. Bowker

Inventor:—
John Vernon Pugh

No. 738,065. Patented September 1, 1903.

UNITED STATES PATENT OFFICE.

JOHN VERNON PUGH, OF COVENTRY, ENGLAND.

FASTENING FOR WHEELS AND CRANKS.

SPECIFICATION forming part of Letters Patent No. 738,065, dated September 1, 1903.

Application filed March 3, 1903. Serial No. 145,955. (No model.)

*To all whom it may concern:*

Be it known that I, JOHN VERNON PUGH, a subject of the King of Great Britain, residing at Primrose Hill House, Coventry, England, have invented certain new and useful Improvements in Fastenings for Wheels and Cranks, of which the following is a specification.

My invention consists of the improvements hereinafter described in attaching wheels, cranks, and other parts of machines and appliances to their axles and shafts; and my invention relates to axles and shafts having in their ends or at the parts to which the wheels, cranks, or the like are to be connected a series of longitudinal grooves or keyways, the bosses of the wheels, cranks, or the like having in them corresponding series of internally-projecting ribs, keys, or projections for taking into and engaging with the grooves or keyways in the axles or shafts. Heretofore it has been necessary to prevent backlash or shakiness to make the internally-projecting ribs or keys of the boss of the wheel or the like the exact counterpart of the grooves in the axle or shaft, or, in other words, to make the engaging parts fit each other perfectly or tightly. Consequently the putting together of the parts has been attended with difficulty and wear, which latter renders the attachment defective.

My invention has for its object to permit the internally-projecting ribs or keys to be made somewhat smaller than the grooves, so as to make the engaging parts fit freely, and thereby facilitate the putting together of the parts and at the same time to obtain a connection wholly free from shakiness or backlash and which is capable of adjustment to compensate for wear.

In carrying my invention into effect I make on one face of the wheel or other part to be attached to the longitudinally-grooved shaft or axle a series of face ratchet-teeth, and I make face ratchet-teeth on a collar or other part to be attached to the shaft or axle, so that when the parts are brought together on the shaft or axle (the face ratchet-teeth of the one part acting on the face ratchet-teeth of the other part) the two parts mutually force each other in opposite rotative directions on the shaft or axle, and the internally-projecting ribs or keys of the two parts on the shaft or axle are thereby made, respectively, to bind on opposite sides of the grooves in the said shaft or axle.

In the accompanying drawings I have illustrated my invention in connection with the attaching of a crank and chain-wheel or chain-wheel-carrying arms of a velocipede to the crank-axle of the same.

Figure 1 represents one-half in side elevation and one-half in vertical section, a portion of the crank and chain-wheel-carrying arms fitted to the end of the crank-axle. Fig. 2 represents in side elevation, and Fig. 3 in end elevation, the chain-wheel-carrying arms detached; and Figs. 4 and 5 represent in side and end elevation, respectively, the axle end of the crank detached. Fig. 6 represents, partly in side elevation and partly in section, a modification in the arrangement of parts where the chain-wheel-carrying arms are made in one piece with the crank; and Figs. 7, 8, 9, and 10 are the two parts of the modified arrangement detached. Figs. 11 to 16, both inclusive, represent further modifications of my invention hereinafter particularly described.

The same letters of reference indicate the same parts in the several figures of the drawings.

I will first describe the arrangement Figs. 1 to 5, both inclusive. $a$ is the crank-axle the ends of which (one only is shown and marked $a^2$) are longitudinally grooved or fluted in the ordinary way. $b$ is the chain-wheel-carrying part, which consists of a central boss, from which project radial arms, to which the chain wheel or ring is fitted, as is usual. The internally-projecting ribs or keys $b^2$ of the boss of the part $b$, (see Fig. 3,) as well as the internally-projecting ribs or keys $c^2$ of the boss of the crank $c$, are made of a size proper to fit easily or freely the grooves of the end $a^2$ of the axle $a$. To prevent shakiness or backlash in the parts, due to their easy or free fitting on the axle, I provide the outer face of the boss of the part $b$ with face ratchet-teeth $b^3$, (see Fig. 2,) and I provide the inner face of the crank with face ratchet-teeth $c^3$, (see Fig. 4,) so that when the ratchet-toothed face $c^3$ of the crank $c$ is made to bear against the ratchet-toothed face $b^3$ of the part $b$, the two parts mutually force each other in opposite rotative directions—that is to say, the ratchet-teeth of the crank tend to turn the part $b$ in the direction of the arrow in Fig. 3, while the face ratchet-teeth $b^3$ of the part $b$, acting on the face ratchet-teeth $c^3$ of the crank $c$, tend to turn the crank in the opposite direction or in the direction of the arrow in Fig. 5, so that the internally-projecting ribs or keys of the two parts bind on opposite sides of the grooves in the end $a^2$ of the axle, and a firm or unshakable locking or connection of the parts results. The parts are preserved in close contact with each other by a screw-nut $d$, screwed onto the reduced screwed end $a^3$ of the axle $a$.

Where a combined crank and chain-wheel-carrying arms are employed, as in Fig. 6, I first pass onto the grooved end $a^2$ of the axle $a$ a ring or collar $e$, (shown separately in Figs. 7 and 8,) the said ring or collar $e$ having internally-projecting teeth $e^2$ (see Fig. 8) and face ratchet-teeth $e^3$ on its outer side, as is best seen in Fig. 7. The other parts and the action of the arrangement differ in no essential respect from that described with reference to the arrangement Figs. 1 to 5.

Figure 12:
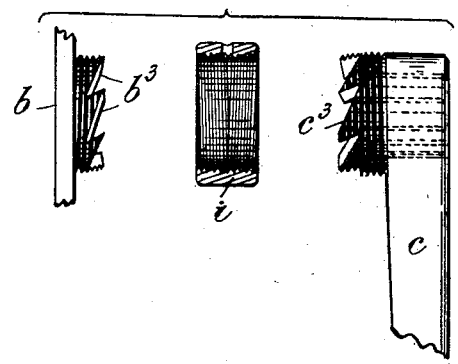

I wish it to be understood that I do not limit myself to keeping the parts together by means of a screw-nut $d$, taking on a screwed end $a^3$ of the axle $a$, as an internally-screwed collar, ferrule, or ring with a right-hand screw-thread in one end and a left-hand screw-thread in the other end may be employed to engage with corresponding external screw-threads on the boss of the chain-wheel-carrying part $b$ and the boss of the crank $c$, respectively, as is illustrated in Figs. 11 and 12, the said internally-screwed collar, ferrule, or ring being marked $i$ in the said Figs. 11 and 12.

Figure 13:
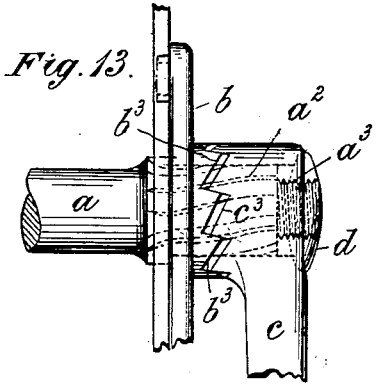
Figure 14:
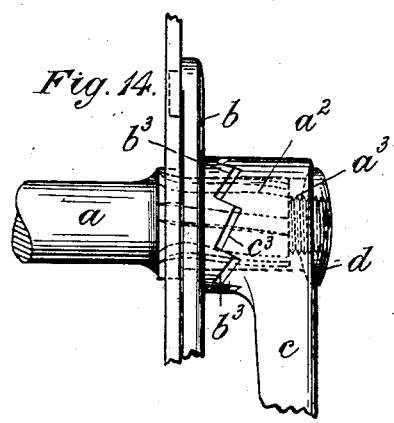
Figure 15:
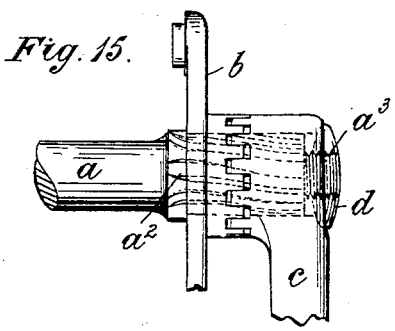
Figure 16:
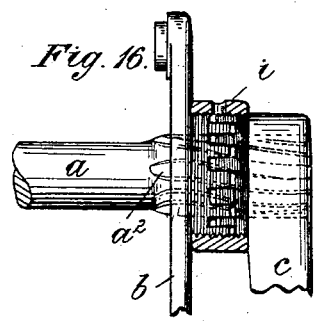

Instead of obtaining the tightening of the chain-wheel-carrying part and the crank on the grooved or fluted crank-axle by the face ratchet-teeth on the two parts, respectively, the said tightening action may be effected partly by the face ratchet-teeth and partly by making the grooves or flutes in the axle and the corresponding ribs or keys in the bosses of the parts to be connected thereto spiral instead of straight, as is usual. In Figs. 13 and 14 I have represented two arrangements showing the combination of face ratchet-teeth with spiral grooves or flutes. In Fig. 13 the engaging faces of the ratchet-teeth are arranged to cross the direction of the flutes or grooves, and in Fig. 14 the engaging faces of the ratchet-teeth are in the same direction as the grooves or flutes, but at a greater angle, or the tightening action may be effected wholly by employing spiral grooves or flutes in the end of the axle and plain projections on the meeting faces of the chain-wheel-carrying part and crank, as is represented in Figs. 15 and 16. With these arrangements the crank $c$ and chain-wheel-carrying parts $b$ are fitted together before being passed onto the end $a^2$ of the axle $a$, and are passed onto and are removed from off the axle, when desired, together. In Fig. 15 the chain-wheel-carrying part $b$ and crank $c$ are forced together and the two parts thereby made to bind on opposite sides of the grooves or flutes in the end $a^2$ of the axle $a$ by means of a screw-nut $d$ taking on the screwed end $a^3$ of the axle $a$, and in Fig. 16 the parts are made to bind on the end $a^2$ of the axle $a$ by the partial turning of the right and left handed internally-screwed collar, ferrule, or ring $i$, by which the crank $c$ and chain-wheel-carrying part $b$ are held together.

I have adopted the title "Fastening for wheels and cranks" as a convenient one. The invention may be employed with facility in many other connections which it is needless to herein specify.

Having now described my invention, what I claim as new, and desire to secure by Letters Patent, is—

1. The combination with a member having grooves, a second member provided with internal ribs or keys extending into said grooves and provided on its outer face with ratchet-teeth, a third member provided with internal ribs or keys also extending into said grooves and provided on its inner face with ratchet-teeth engaging those of said second member, and means for holding the sets of ratchet-teeth in engagement.

2. The combination with a member having longitudinal grooves, a second member provided with internal ribs or keys extending into said grooves and having ratchet-teeth on its outer face, the pitch of which is at an angle to the direction of said grooves, a third member also having internal ribs or keys extending into said grooves and provided on its inner face with ratchet-teeth similar to and engaging said other ratchet-teeth, and means for holding the two sets of ratchet-teeth in engagement.

3. The combination with a member having grooves, a second member provided with internal ribs or keys extending into said grooves, external screw-threads, and ratchet-teeth on its outer face, a third member provided with a hub on said first member, said hub also having internal ribs or keys extending into said grooves, external screw-threads on its inner end portion, and ratchet-teeth on its inner face engaging said other ratchet-teeth, and a thimble having its end portions oppositely screw-threaded internally and engaging the first-mentioned screw-threaded portions to hold the two sets of ratchet-teeth in engagement.

In testimony whereof I have hereunto set my hand in presence of two subscribing witnesses.

JOHN VERNON PUGH.

Witnesses:
RICHARD SKERRETT,
WILLIAM J. BOWKER.